United States Patent
Lee

(10) Patent No.: US 11,507,819 B2
(45) Date of Patent: Nov. 22, 2022

(54) APPARATUS AND METHOD FOR RECOGNIZING INFORMATION OF NEUROMORPHIC DEVICE WITH SIGNAL EXTRACTING CIRCUITS FOR SELECTING OUTPUT NODES CORRESPONDING TO RECOGNITION SIGNAL HAVING MAXIMUM VALUE

(71) Applicant: SK hynix Inc., Gyeonggi-do (KR)

(72) Inventor: Dong-Beom Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 1293 days.

(21) Appl. No.: 15/645,380

(22) Filed: Jul. 10, 2017

(65) Prior Publication Data
US 2018/0174045 A1 Jun. 21, 2018

(30) Foreign Application Priority Data
Dec. 16, 2016 (KR) .................. 10-2016-0172611

(51) Int. Cl.
G06N 3/08 (2006.01)
G06N 3/063 (2006.01)
(52) U.S. Cl.
CPC ............ *G06N 3/08* (2013.01); *G06N 3/063* (2013.01)
(58) Field of Classification Search
CPC ................... G06N 3/08; G06N 3/063
See application file for complete search history.

(56) References Cited

U.S. PATENT DOCUMENTS

| | | | | |
|---|---|---|---|---|
| 3,634,849 A | * | 1/1972 | Nishizawa | G01T 1/2928 250/214 R |
| 4,659,948 A | | 4/1987 | Sunter et al. | |
| 5,293,457 A | * | 3/1994 | Arima | G06N 3/063 706/34 |
| 6,687,686 B1 | * | 2/2004 | Nervegna | G06N 3/063 706/15 |
| 2017/0061326 A1 | * | 3/2017 | Talathi | G06K 9/6257 |

FOREIGN PATENT DOCUMENTS

KR   1020120108882   10/2012

OTHER PUBLICATIONS

Joubert et al. Hardware spiking neurons design: analog or digital? WCCI 2012 IEEE World Congress on Computational Intelligence Jun. 10-15, 2012—Brisbane, Australia (Year: 2012).*

* cited by examiner

*Primary Examiner* — Alexey Shmatov
*Assistant Examiner* — Robert Bejcek, II
(74) *Attorney, Agent, or Firm* — IP & T Group LLP

(57) ABSTRACT

A neuromorphic device according to various embodiments of the present disclosure includes a recognizing unit suitable for recognizing information based on a plurality of learned results to generate a plurality of recognition signals, a maximum value extracting unit suitable for respectively extracting values of the plurality of recognition signals and extracting a recognition signal having a maximum value among the plurality of recognition signals, and a control unit suitable for processing the information based on the recognition signal having the maximum value.

15 Claims, 5 Drawing Sheets

Perceptron

MLP

APPARATUS AND METHOD FOR RECOGNIZING INFORMATION OF NEUROMORPHIC DEVICE WITH SIGNAL EXTRACTING CIRCUITS FOR SELECTING OUTPUT NODES CORRESPONDING TO RECOGNITION SIGNAL HAVING MAXIMUM VALUE

CROSS-REFERENCE TO RELATED APPLICATION

This application claims priority under 35 U.S.C. § 119 to Korean Patent Application No. 10-2016-0172611 filed on Dec. 16, 2016 in the Korean Intellectual Property Office, the disclosure of which is incorporated herein by reference in its entirety.

TECHNICAL FIELD

Exemplary embodiments of the present disclosure relate to a neuromorphic device and method and, more particularly, to a device and method capable of extracting a maximum value to process information, when recognizing input information.

DISCUSSION OF THE RELATED ART

According to development of artificial intelligence technology, attempts to implement this technology in hardware are being performed. One example for the attempts may include a neuromorphic chip replicating the human brain. A neuromorphic chip may generally allow an artificial intelligence algorithm which has been realized in software to be implemented in hardware. An artificial intelligence algorithm may be largely classified into an operation of learning and an operation of recognizing input information on the basis of the learned result.

In the operation of recognizing the input information, in a more effective way, a neuromorphic device may require to recognize the input information on the basis of the learned result to output a plurality of signals, and extract the plurality of output signals according to the recognized result to output a result of recognized information from among the extracted signals.

SUMMARY

Various embodiments are directed to a device and method capable of extracting a signal having a maximum value from among signals recognized by a neuromorphic device.

In an embodiment, a neuromorphic device may include: a recognizing unit suitable for recognizing information based on a plurality of learned results to generate a plurality of recognition signals; a maximum value extracting unit suitable for respectively extracting values of the plurality of recognition signals and extracting a recognition signal having a maximum value among the plurality of recognition signals; and a control unit suitable for processing the information based on the recognition signal having the maximum value.

In an embodiment, an operating method of a neuromorphic device may include: recognizing information based on a plurality of learned results to generate a plurality of recognition signals; extracting a recognition signal having a maximum value from among the plurality of recognition signals; and processing the information based on the recognition signal having the maximum value.

DETAILED DESCRIPTION

Hereinafter, embodiments of the present disclosure will be described in detail with reference to the accompanying drawings. The following descriptions will be made focusing on configurations necessary for understanding embodiments of the disclosure. Therefore, descriptions of other configurations that might obscure the gist of the disclosure will be omitted.

According to development of artificial intelligence technology, attempts to implement this technology in hardware are being performed. One example for the attempts may be a neuromorphic chip replicating the human brain. Through the neuromorphic chip, an artificial intelligence algorithm having been realized in software may be alternatively implemented in hardware. The artificial intelligence algorithm may be classified into a learning operation and a recognizing operation on the basis of the learned result. In the learning operation, a plurality of information may be learned. In the recognizing operation, the input information may be recognized based on types of the plurality of the learned information. For example the information recognition may be person recognition, animal recognition, or plant recognition, etc. In addition, the information recognition may be emotion recognition (e.g., joy, sorrow, or anger etc.) of a person or an animal. At this point, in the recognizing operation, various output values corresponding to the various types of the learned information may be generated, and final recognition information may be generated by taking a maximum value from among the various output values (i.e., an output value having highest possibility). A neuromorphic device according to various embodiments of the present disclosure may provide a device and method capable of learning a plurality of information and storing the learned result in a learning operation, recognizing input information on the basis of the learned information to output a plurality of recognized signals in a recognizing operation, and extracting efficiently a maximum value from among the recognized signals to process the finally recognized information.

Figure 1A:
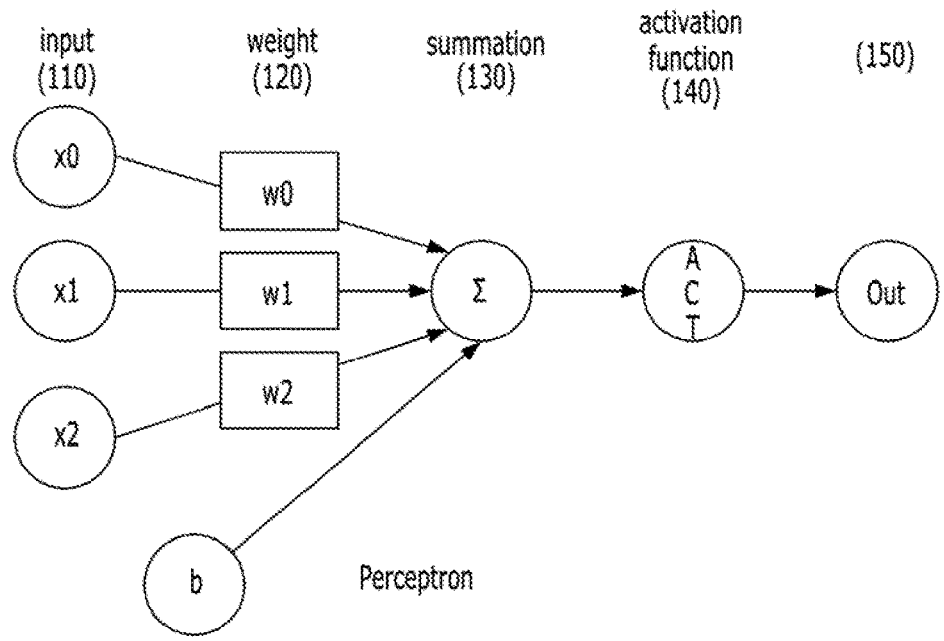
FIG. 1A is a diagram illustrating a structure of a perceptron and FIG. 1B a diagram illustrating a structure of a multi-layer perceptron (MLP).
Figure 1B:
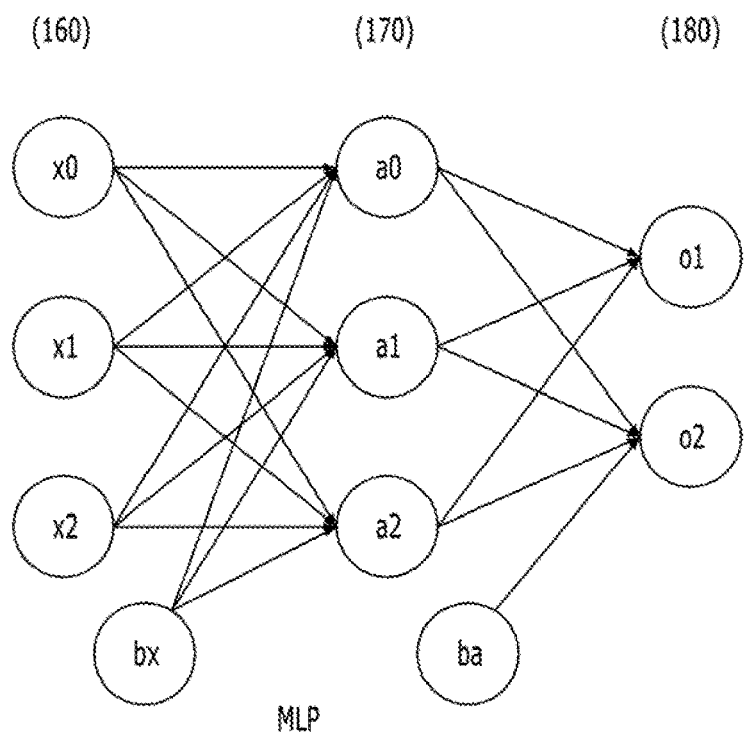

FIG. 1A illustrates a structure of a perceptron and FIG. 1B illustrates a structure of a multi-layer perceptron (MLP).

Referring to FIGS. 1A and 1B, a neural network algorithm may be an algorithm obtained by mathematically modeling the brain of a mammal. The brain of a mammal is formed of numerous monomers intertwined like a mesh and such a monomer may become a neuron. In the neuron, a synapse may deliver an electric signal to a synapse of another neuron. A manner that the synapse delivers the electric signal may be N:N matching, not 1:1 matching. In other words, one synapse may deliver an electric signal to one synapse, or one synapse may also deliver an electric signal to several synapses.

The perceptron may be a mathematical model for modeling a neuron monomer and the MLP may be a structure in which perceptrons are woven in a mesh. The perceptron and MLP may be basic models of a neural network circuit. The perceptron may be an algorithm by making a neuron that is a human neural cell to a calculable type.

The perceptron may multiply a plurality of inputs 110 by respective weights 120 corresponding thereto and then generate a result value (i.e. sum of products) obtained by summing the multiplied values through an adder 130. An activating unit 140 may set whether to activate an output of the adder 130 on the basis of an activation function and output the output of the adder 130 through an output unit 150. For illustration only, FIG. 1A illustrates an example of a structure in which three inputs x0 to x2 are respectively multiplied by three weights w0 to w2 corresponding thereto and the multiplied signals are summed (sum of products or vector multiplication) through the adder 130. In FIG. 1A, b means a bias and may be used to learn a threshold value for determining whether input data is activated. The perceptron may be an algorithm capable of addressing a linearly separable limitation using a sum of weights. The perceptron of the structure like FIG. 1A may perform a linear separation function but not perform a non-linear separation function.

The perceptron may find out a linear boundary for linearly separating a learning vector into two categories. The weight may be a value for representing a directivity or shape of the linear boundary. The bias may be a value for representing an intercept of the linear boundary and the threshold value may mean a minimum value for activating a certain value. The activation function may be a function for outputting 1 when a value calculated in a neuron is equal to or greater than a threshold value, and for outputting 0 when the value calculated in the neuron is less than the threshold value. The calculated value may be a sum of products (SOP) obtained by summing products of input values and weights. In the MLP, other types of activation functions may be used. In other words, as a smallest monomer forming an artificial neural network, a neuron may be activated to output 1, when the SOP is equal to or greater than a threshold value, and may be deactivated to output 0, when the SOP is less than the threshold value. The perceptron (namely, a single layer perceptron) may be formed of an input layer and an output layer. The input layer may be a layer to which a learning vector or an input vector is inputted. Data of the input layer may be delivered to a neuron of the output layer and may be output as a value according to the activation function.

Referring to FIG. 1B, the nonlinear separation function may be addressed by weaving multiple layers of perceptrons in a mesh. The MLP may perform the nonlinear separation function using a plurality of linear separation functions. The MLP may be a feed-forward neural network formed of an input layer 160, a hidden layer 170 formed of hidden nodes and an output layer 180. For illustration only, FIG. 1B illustrates an MLP structure configured of the input layer 160 formed of input values x0 to x2 and a bias bx, the hidden layer 170 formed of nodes a0 to a2, and the output layer 180 formed of nodes o1 to o2.

The input layer 160 may deliver received values to the hidden layer 170 without a change. The hidden layer 170 may include a plurality of nodes (for example, a0 to a2 in FIG. 1B). Each node may multiply a plurality of input signals by one or more weights and then output one or more summed signals of the multiplied signals. The hidden layer 170 may perform sum calculation and activation function calculation and deliver the calculation result to the output layer 180. The output layer 180 may perform the sum calculation and the activation function calculation and generate the calculation result as an output signal. In other words, the MLP may perform forward calculation starting from left and proceeding only rightward, with the hidden layer 170 performing weight summing calculations of the input signals received from the input layer 160 and activation function calculations and outputting the results to the output layer 180. The weight summing calculation may be a type for combining nodes of the input layer 160 or the hidden layer 170. As a nonlinear function (e.g. a sigmoid function), the activation function may be a function for performing conversion on input variables from the input layer 160 in the hidden layer 170 or the combination of outputs from the nodes of the hidden layer 170 in the output layer 180.

For example in a case of learning a specific image, when image information reaches at a first layer as the input layer 160, a neuromorphic device may extract features of the image and then deliver the extracted features to a next layer, e.g., the hidden layer 170. For example, the extracted features may be at least one of a shape, magnitude, color, pattern etc. A feature extraction operation may be iteratively performed a predetermined number of times and information in accordance with the feature extraction operation may be extracted. Extraction of the information means that only core information that is necessary for classifying the information into one of a plurality of preset image information types is obtained. On the basis of the extracted information, an image information type may be determined in a final layer such as the classification layer 330 in FIG. 3.

The learning operation may be respectively performed on a plurality of information. When the plurality of information are learned, the neuromorphic device may recognize a plurality of input information. At this point, when one of information is inputted, the neuromorphic device may perform a recognizing operation on the basis of the learned information and output a plurality of output signals based on the respective learned information at the time of outputting the recognized result. A neuromorphic device according to various embodiments of the present disclosure may output, as a plurality of analog signals, recognition results for the input information, and extract a maximum value from among the plurality of analog signals without performing a digital conversion process. The neuromorphic device may output a recognition result when the recognized signal has a value equal to or greater than a certain value.

Figure 2:
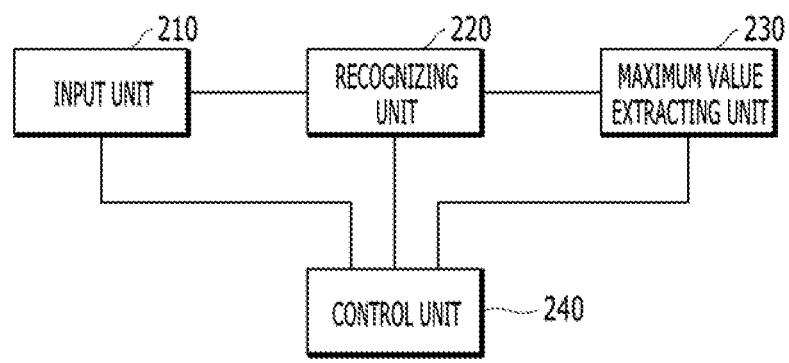
FIG. 2 is a diagram illustrating a neuromorphic device according to various embodiments of the present disclosure.

FIG. 2 illustrates a neuromorphic device according to various embodiments of the present disclosure.

Referring to FIG. 2, the neuromorphic device may learn a plurality of information and store the learned information. In addition, at the time of recognition the neuromorphic device may generate a plurality of recognition result signals on the basis of the learned information. The neuromorphic device may include an input unit 210, a recognizing unit 220, a maximum value extracting unit 230 and a control unit

240. The input unit 210 may receive information to be recognized. The input information may be an image, a voice, a natural language, etc. The input unit 210 may be a camera, a scanner, a microphone, etc. The input unit 210 may be a communication unit such as a wireless and/or wired communication interface connectable with an external electronic device. The external electronic device may be an electronic device such as a computer, a mobile phone, a tablet, etc.

The recognizing unit 220 may store the learned result values for the plurality of learned information. The recognizing unit 220 may recognize input information on the basis of the learned information and output recognized result values respectively corresponding to the learned information. The maximum value extracting unit 230 may compare magnitudes of the recognized result values received from the recognizing unit 220 and output the recognized result value having the maximum value among the recognized result values. The control unit 240 may control the entire operation of the neuromorphic device. The control unit 240 may analyze result values received from the maximum value extracting unit 230 and determine to output information corresponding to the maximum value. The neuromorphic device may be implemented by using a processor or a computer. That is, the input unit 210, the recognizing unit 220, the maximum value extracting unit 230 and control unit 240 may be implemented by using a computer system, a processor system, or a firmware system having storage devices, for example, one or more memory devices.

Figure 3:
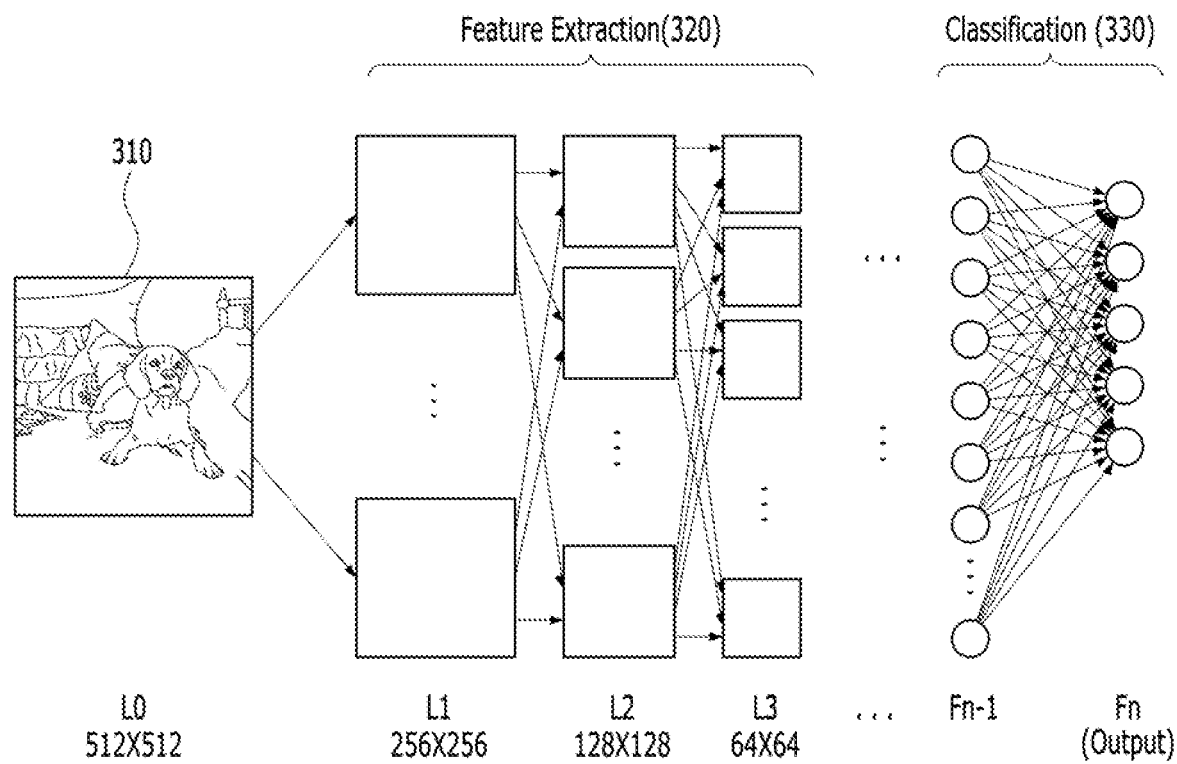
FIG. 3 is a diagram illustrating an operation of a recognizing unit in a neuromorphic device according to various embodiments of the present disclosure.

FIG. 3 is a diagram illustrating an operation of a recognizing unit in a neuromorphic device according to various embodiments of the present disclosure, for example, the recognizing unit 220 of FIG. 2. For illustration only, FIG. 3 illustrates a recognizing unit having a structure of a convolutional neural network (CNN) algorithm, e.g., a CNN feedforward algorithm.

Referring to FIG. 3, the CNN may include a feature extraction part 320 for extracting feature of input information 310 and a classification part 330 for generating an output signal based on the extracted feature. The feature extraction part 320 may iteratively perform operations to extract one or more features of the input information a set number of times. For this, the feature extraction part 320 may include at least one pair of a convolution layer and a pooling layer to extract the one or more features of the input information. In some embodiments, the convolution layer may perform calculation data that belongs to input data and weight data that has the same input depth and weight depth, and the pooling layer may perform operation for selecting a maximum value of the values of a plurality of input data that enters a pooling window, or calculating an average value of the plurality of input data. The feature extraction part 320 may have a structure in which output data processed by a pair of a convolution layer and a pooling layer is fed forward as an input to a next pair of a convolution layer and a pooling layer. For example, the input information (e.g., L0 512×512 image) may become input data (e.g., 256×256 image) for a first convolution layer (e.g., L1) of the first pair of the feature extraction part 320 and data processed and output by the first convolution layer may become input data for a first pooling layer. In addition, output data processed by the first pooling layer may become input data (e.g., 128×128 image) of a second convolution layer (e.g., L2) of the next pair of the feature extraction part 320, and output data processed by a second pooling layer may become input data (e.g., 64×64 image) of a third convolution layer (e.g., L3) of the next pair of the feature extraction part 320. The operations of the convolution layer and the pooling layer may be repeated for an N number of times set by the control unit 240. The output from a pooling layer of a final pair of the feature extraction part 320 may become input data of the classification part 330.

The classification part 330 may include at least one fully connected layer (e.g., Fn-1 and Fn). The classification part 330 may perform an operation of the fully connected layer a preset number of times (e.g., 2 times such as Fn-1 and Fn), which may be set by the control unit 240. The output of the classification part 330 may indicate that the learning is completed. Output data may be generated in a number corresponding to the number of learned information.

Figure 4:
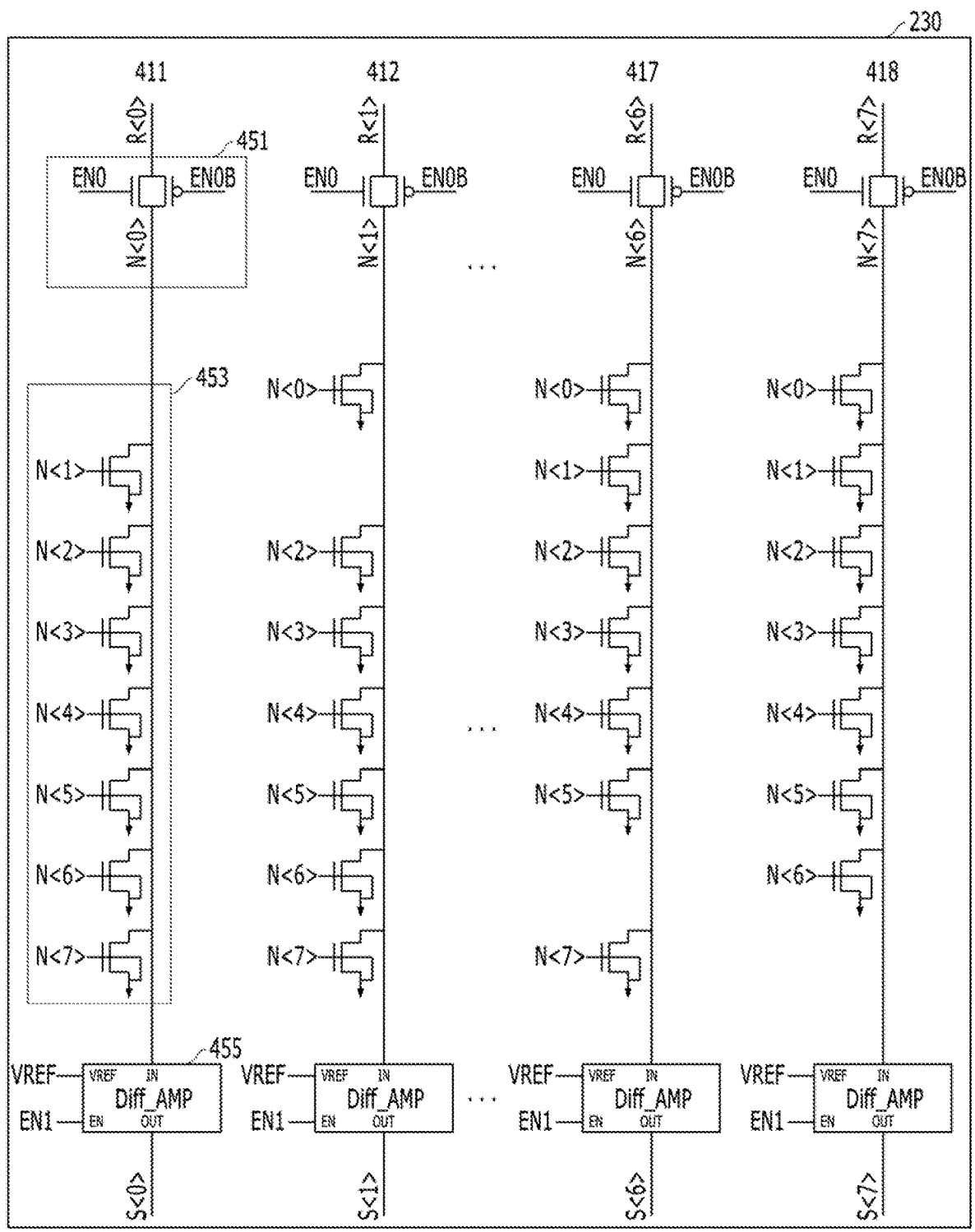
FIG. 4 is a diagram illustrating a maximum value extracting unit in a neuromorphic device according to various embodiments of the present disclosure.
Figure 5:
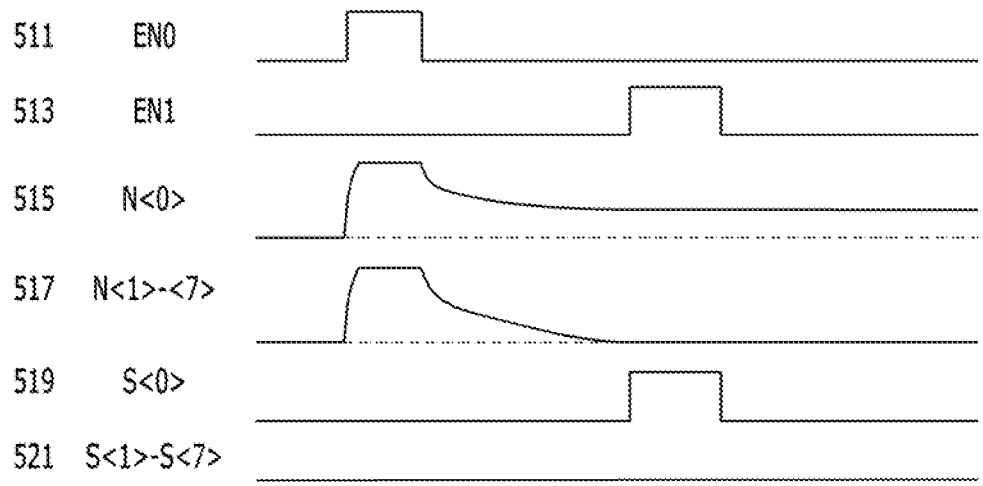
FIG. 5 is a diagram illustrating an operation timing of a maximum value extracting unit in a neuromorphic device according to various embodiments of the present disclosure.

FIG. 4 illustrates a maximum value extracting unit in a neuromorphic device according to various embodiments of the present disclosure, for example, the maximum value extracting unit 230 of FIG. 2. FIG. 5 illustrates an operation timing of a maximum value extracting unit in a neuromorphic device according to various embodiments of the present disclosure, for example, the maximum value extracting unit 230 of FIG. 4.

Referring to FIG. 4, the maximum value extracting unit 230 may include signal extracting units in a number corresponding to the number of output signals from the recognizing unit 220 of FIG. 2. For illustration only, FIG. 4 illustrates an example of a case where the recognizing unit 220 outputs 8 signals R0 to R7 and the maximum value extracting unit 230 receives 8 signals R0 to R7. In this case, the maximum value extracting unit 230 may include 8 signal extracting units 411 to 418. In other words, when the recognizing unit 220 recognizes information on the basis of 8 learned information, recognized result values may be output as R0 to R7 on the basis of each learned information.

Each of the signal extracting units 411 to 410 may include a first switch 451, a second switch 453 and a differential amplifier 455.

The first switch 451 may receive a signal output from the recognizing unit 220. Here, the output signal of the recognizing unit 220, which is inputted to the first switch 451, may be a first recognition signal. The first switch 451 may be turn on by a first control signal EN0 and the first recognition signal may be applied to a connection node. The first switch 451 may be a transmission gate.

The second switch 453 may include a plurality of transistors. In each transistor for the second switch 453, a first electrode may be coupled to a connection node thereof (e.g., N<0>) an electrode for a second power supply voltage (e.g., bulk) may be coupled to an electrode for a ground power supply voltage, and a gate electrode may be coupled to each connection node of other signal extracting units (e.g., N<1> to N<7>). In other words, gate electrodes of the second switch 453 may be respectively coupled to connection nodes of other signal extracting units (e.g., N<1> to N<7>) except a signal extracting unit of its own (e.g., N<0>). Here output signals of other signal extracting units respectively coupled to the gate electrodes of the second switch 453 may be second recognition signals. The number of the plurality of transistors of the second switch 453 may be smaller than the number of output signals of the recognizing unit 220, for example, when the number of the recognizing unit 220 is n (e.g., 8), the number of the transistors may be (n−1) (e.g., 7). In FIG. 4, although the transistors are exemplarily illustrated as NMOS transistors the transistors may be PMOS transistors.

The differential amplifier 455 may include a first input terminal coupled to a connection node and a second input terminal coupled to receive a reference voltage Vref. When a second control signal EN1 is activated, the differential amplifier 455 may output a signal according to a difference between a voltage of the connection node and the reference voltage Vref. The differential amplifier 455 may compare a first recognition signal (e.g., R<0>) applied to the connection node with the reference voltage Vref and output a signal according to a difference therebetween. At this point, a signal generated at the connection node of each of the signal extracting units 411 and 418 may be an analog signal. The differential amplifier 455 may output a pulse type having a power supply voltage (e.g., Vcc) level or a ground voltage (e.g., Vss) level according to the difference between the input analog signal and the reference voltage Vref. In other words, the differential amplifier 455 may receive an analog signal, convert the analog signal to a digital signal, and output the digital signal.

In FIG. 4, R<0> to R<7> may be signals from output nodes of a final stage outputting recognition result values in the recognizing unit 220. In addition, N<0> to N<7> may be signals from connection nodes, which pass through the first switch as the transmission gate 451 at the corresponding signal extracting units 411 to 418. Seven NMOS transistors may be coupled to each connection node of the signal extracting units 411 to 418 and gates of the 7 NMOS transistors may be coupled to respective connection nodes of the remaining signal extracting units except its own node (i.e. a recognition result value inputted to its own signal extracting unit). In addition, connection nodes of the signal extracting units 411 to 418 may be respectively coupled to the differential amplifier 455, and the differential amplifier 455 may output S<0> to S<7> respectively having logic high or logic low level on the basis of the difference between a potential of a connection node of the corresponding signal extracting unit and the reference voltage Vref.

In FIG. 4, the signal extracting unit 410 may receive a first recognition signal R0 and the second switch 453 may be switching-controlled by second recognition signals R1 to R7 to change a level of the first recognition signal R0 applied to the connection node. The signal extracting 411 may receive a first recognition signal R1, and the second switch 453 may be switching-controlled by second recognition signals R0, R2 to R7 to change a level of the first recognition signal R1 applied to the connection node. In this way, the signal extracting units 412 to 417 may operate.

The output signals of the recognizing unit 220 may be coupled to the first switch 451 and the second switch 453 of the signal extracting units 411 to 418 according to the following table 1.

TABLE 1

| Signal extracting unit | First switch input | Gate input of second switch | Output of differential amplifier |
|---|---|---|---|
| 411 | R0 | N1-N7 | Determined by values of R0 and Vref |
| 412 | R1 | N0, N2-N7 | Determined by values of R1 and Vref |
| 413 | R2 | N0, N1, N3-N7 | Determined by values of R2 and Vref |
| 414 | R3 | N0-N2, N4-N7 | Determined by values of R3 and Vref |
| 415 | R4 | N0-N3, N5-N7 | Determined by values of R4 and Vref |
| 416 | R5 | N0-N4, N6, N7 | Determined by values of R5 and Vref |
| 417 | R6 | N0-N5, N7 | Determined by values of R6 and Vref |
| 418 | R7 | N0-N6 | Determine by values of R7 and Vref |

Referring to FIG. 5, when a first control signal EN0 is activated (551), the transmission gates 451 of the signal extracting units 411 to 418 may be turned on to respectively apply signals received from the recognizing unit 220 to the connection nodes of the corresponding signal extracting units (515 and 517). Hereinafter, an exemplary description will be provided about a case where R<0> has a maximum value.

After values of R<0> to R<7> are determined in the recognizing unit 220, when the first control signal EN0 is generated (511), the signal extracting units 411 to 418 may deliver N<0> to N<7> to their own connection nodes, respectively. At this point, N<0> may be delivered to the connection node of the signal extracting unit 410 (515), and N<1> to N<7> may be respectively delivered to the connection nodes of the signal extracting units 411 to 417 (517). In addition, N<1> to <7> of connection nodes of other signal extracting units 411 to 417 may be applied to respective gates of the second switch 453 of the signal extracting unit 411. Thereafter, when the first control signal EN0 is deactivated (511), the second switch 453 of the signal extracting unit 411 may be switching-controlled by the connection node signals N<1> to N<7> of other signal extracting units 412 to 418 and accordingly, a connection node potential of the signal extracting unit 411 may be dropped (515). In addition, the second switches 453 of the signal extracting units 412 to 418 may be switching-controlled by connection node signals of other signal extracting units, and accordingly connection node potentials thereof may be dropped (517). At this point, since R<0> may have a largest value in comparison to R<1> to R<7>, voltage drops of other signal extracting units 412 to 418 may be greater (517). Accordingly, the connection node potential of the signal extracting unit 411 may converge to a constant value after a certain time passes (515). In other words, the remaining connection node signals N<1> to N<7>, except N<0> having the largest value, may converge to Vss and N<0> may converge without being dropped below the certain voltage. At this point, a signal generated at the connection node may be an analog signal (515 and 519).

Thereafter, when a second control signal EN is activated (513), the differential amplifiers of the signal extracting units 411 to 418 may operate. Then, since the connection node of the differential amplifier 455 may have a larger value than the reference voltage Vref, the differential amplifier 455 of the signal extracting unit 411 may output a signal having a logic high level. In addition, since the connection nodes of the differential amplifiers 455 have smaller values than the reference voltage Vref, the differential amplifiers 455 of the other signal extracting units 412 to 418 may output signals having a logic low level. Accordingly, an output signal S<0> of the signal extracting unit 411 may be a signal having a logic high level (519), and output signals S<1> to S<7> of other signal extracting units 412 to 418 may be signals having a logic low level (521). In other words, the differential amplifiers 455 may receive analog signals N<0> to N<7> (515 and 517) to output digital signals S<0> to S<7> (519 and 521).

The control unit 240 may analyze signals (519 and 521) received from the maximum value extracting unit 230, check a signal extracting unit that outputs a maximum value among the plurality of signal extracting units 411 to 418 and output a recognition result value according to the checked result.

The recognizing unit 220 may output various types of outputs according to the recognition result. For example, when it is assumed that the recognizing unit 220 generates output signals between 1 and 0, according to a recognition ratio, the recognizing unit 220 may generate an output signal close to 1 in a case where the recognition ratio is relatively high. Furthermore, although the recognition ratio for specific information is relatively low, differences with recognition ratios for other information may be increased. For example when an output signal with 0.6 is generated for specifc learned information and output signals with 0.1 or smaller are generated for other learned information, the specific learned information may be recognized as having a maximum value in spite of inaccurate recognition. The maximum value extracting unit 230 may adjust the reference voltage Vref to allow only the recognition value having a maximum value is equal to or greater than a certain value to be output. For example, the reference voltage Vref may be adjusted to allow a maximum value with 0.7 or greater to be output. When such an adjustment is performed and a maximum value among R<0> to R<7> is 0.9, the maximum value may be output, but when the maximum value is 0.6, the maximum value may not be outputted.

In addition, a minimum value may be extracted from among output signals of the recognizing unit 220. In case of configuring the extracting unit with the minimum value, when the second switch 453 is formed of PMOS transistors, instead of NMOS transistors, a scheme of finding out a minimum value may be used.

As described above, in a neuromorphic device using an artificial intelligence algorithm according to various embodiments of the present disclosure, when a maximum value is extracted from among recognition result values output from the recognizing unit 220, the maximum value may be extracted by connecting a connection node of a signal extracting unit as switching control signals of switches coupled to connection nodes of other signal extracting units. When the maximum value is extracted, the signal extracting units may include differential amplifiers to allow only one signal extracting unit from among a plurality of signal extracting units to output a different value. In addition, when a maximum value of the recognition unit 200 is extracted by adjusting a reference voltage Vref for the differential amplifier 455, it may be adjusted to output the maximum value only in a case where the maximum value is equal to or greater than a set value.

Figure 6:
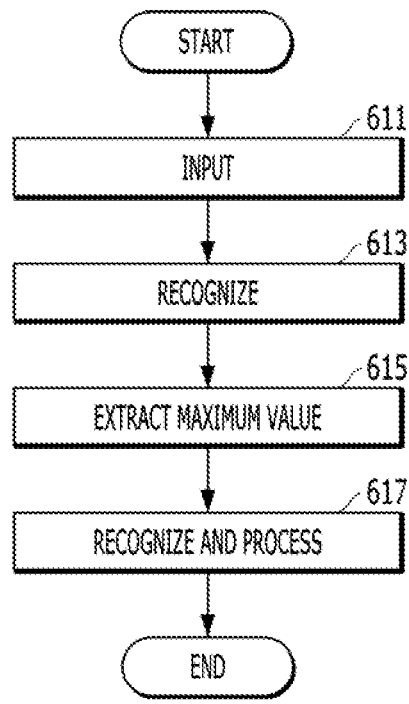
FIG. 6 is a flowchart illustrating an operation of neuromorphic device according to various embodiments of the present disclosure.

FIG. 6 is a flowchart illustrating an operation of the neuromorphic device according to various embodiments of the present disclosure. For example, the operation of FIG. 6 may be performed by the neuromorphic device in FIGS. 2 to 4.

Referring to FIG. 6, the neuromorphic device may learn a plurality of information and store the learned result values. When information is inputted in a state where a plurality of learned information are provided, the neuromorphic device may recognize this in operation 611 and perform an operation of recognizing the input information on the basis of the learned information in operation 613. The neuromorphic device may output a plurality of recognition result values on the basis of the learned information in the recognition process. The recognition result value may be an analog signal having a value between 1 and 0 according to a degree of recognition precision. When the recognition result value is output, the neuromorphic device may extract a maximum value from among the plurality of recognition result values in operation 515. Then, the neuromorphic device may recognize the learned information corresponding to the extracted maximum value and process to output as the recognition result in operation 617.

Figure 7:
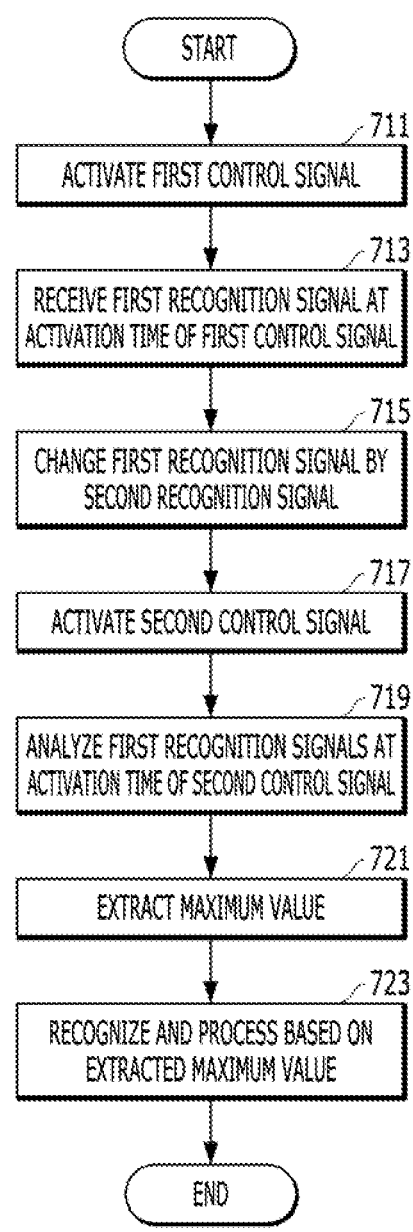
FIG. 7 is a flowchart illustrating an operation for extracting a maximum value in a neuromorphic device according to various embodiments of the present disclosure.

FIG. 7 is a flowchart illustrating an operation for extracting a maximum value in a neuromorphic device according to various embodiments of the present disclosure. For example, the operation of FIG. 7 may be performed by the neuromorphic device in FIGS. 2 to 4.

Referring to FIG. 7, when the recognition result values are output based on the learned information, the neuromorphic device may activate the first control signal EN0 for performing a maximum value extracting operation in operation 711. When the first control signal EN0 is activated, the neuromorphic device may apply the recognition result values to respectively corresponding connection nodes of the signal extracting units 411 to 418 in order to extract a maximum value in operation 713. In other words, the connection nodes of the signal extracting units 411 to 418 may receive the first recognition signal at activation time of the first control signal EN0. Then the first control signal EN0 may be deactivated. Thereafter, in the neuromorphic device, a voltage level of the first recognition signal (e.g. N<0> of FIG. 4) of the connection node may be changed by second recognition signals (e.g. N<1> to N<7> of FIG. 4) in operation 715. In other words, when the first control signal EN0 is deactivated, the connection node potential of the signal extracting unit may start to be dropped based on the recognition result value that is inputted to other signal extracting units. At this point, the connection node of the signal extracting unit, which receives the maximum value, may have a magnitude of power supply voltage equal to or greater than the set value, while connection nodes of other signal extracting units may have values converging to 0. Then, when the second control signal EN1 is activated, the neuromorphic device may recognize this in operation 717 and output signals based on a difference between the set reference value and the power supply voltage of the connection node in operation 719. In other words, the neuromorphic device may analyze the change of the first recognition signal at activation time of the second control signal EN1. Thereafter, the neuromorphic device may analyze signals output from the signal extracting unit to extract the maximum value in operation 721. Then, the neuromorphic device may recognize the extracted maximum value and process to output a result corresponding to the extracted maximum value in operation 723.

In the neuromorphic device realizing the artificial intelligence in hardware in this way, when a maximum value is extracted from among a plurality of output values having an analog signal, the maximum value may be extracted without performing a digital conversion operation. Accordingly, when the maximum value is extracted, the operation of converting the recognition result value to a digital value may not be performed and thus a circuit area of the neuromorphic device may be reduced. In addition, when the maximum value is extracted, the reference voltage may be set to a proper value and then the maximum value may be detected only for the recognition result values having a value equal to or greater than a certain magnitude.

While this disclosure has been described with reference to exemplary embodiments thereof, it will be clear to those of ordinary skill in the art to which the disclosure pertains that various modifications may be made to the described embodiments without departing from the spirit and scope of the present disclosure. Therefore, the scope of the present disclosure is not limited to the described embodiments but is defined by the claims and their equivalents.

What is claimed is:

1. A neuromorphic device comprising:
   a memory suitable for storing instructions;
   one or more processors in communication with the memory and execute the instructions to recognize information of input nodes based on a plurality of learned results and generating a plurality of recognition signals of output nodes;
   a plurality of signal extracting circuits each coupled to a corresponding output node and each comprising:
      a first switch suitable for applying a corresponding recognition signal to a first connection node of a corresponding signal extracting circuit,
      a second switch including a plurality of transistors coupled to the first connection node, the plurality of transistors individually controlled by voltages of plural second connection nodes of other signal extracting circuits for changing a voltage level of the first connection node when the plurality of transistors is individually turned on, and
      a comparator suitable for outputting a logic high level signal or a logic low level signal depending on a comparison result of the voltage level of the first connection node, which is changed by the second switch, and a reference voltage; and
   a controller suitable for outputting a neuromorphic operation result based on an output node corresponding to a signal extracting circuit outputting the logic high level signal,
   wherein when the corresponding recognition signal having a maximum value among the plurality of recognition signals is inputted, the second switch drops a level of the first connection node, and
   when the corresponding recognition signal has non-maximum value among the plurality of recognition signals, the second switch couples the first connection node to a ground voltage.

2. The neuromorphic device of claim 1, further comprising:
   an interface to which the information to be recognized is received.

3. The neuromorphic device of claim 1, wherein the comparator generates the comparison result after the voltage of the first connection node is converged to a constant value.

4. The neuromorphic device of claim 3, wherein each of the plurality of transistors comprises a first electrode coupled to the first connection node, a second electrode coupled to the first power supply voltage, and a gate electrode coupled to respective second connection nodes.

5. The neuromorphic device of claim 4, wherein the first power supply voltage includes a ground power supply voltage.

6. The neuromorphic device of claim 3, wherein the first switch is a transmission gate that is turned on by a first control signal to deliver a signal of the corresponding output node to the first connection node, and is turned off in a deactivation period of the first control signal.

7. The neuromorphic device of claim 3, wherein each of the signal extracting units delivers a signal of the corresponding output node to the first connection node by a first control signal, and a voltage of the first connection node is changed by the second switch in a period where the first control signal is deactivated.

8. The neuromorphic device of claim 3, wherein the comparator includes a differential amplifier suitable for outputting a digital signal based on a difference between the voltage of the first connection node and the reference voltage.

9. The neuromorphic device of claim 8, wherein the reference voltage is a voltage at which logic high level is output when the maximum value of the recognition signal is more than a predetermined value.

10. An operating method of a neuromorphic device, comprising:
    recognizing information based on a plurality of learned results to generate a plurality of recognition signals;
    applying a corresponding recognition signal to a first connection node of a corresponding signal extracting circuit among a plurality of signal extracting circuits;
    controlling switch transistors coupled to the first connection node by applying voltage of second connection nodes of other signal extracting circuits to transistors;
    changing a voltage level of the first connection node by the switch transistors;
    outputting a logic high level signal or a logic low level signal depending on a comparison result of the voltage level of the first connection node, which is changed by the switch transistors, and a reference voltage;
    outputting a neuromorphic operation result based on an output node corresponding to a signal extracting circuit outputting the logic high level signal,
    wherein discharging the first connection node comprises:
       dropping a level of the first connection node when the corresponding recognition signal having a maximum value among the plurality of recognition signals is inputted; and
       coupling the first connection node to a ground voltage when the corresponding recognition signal has non-maximum value among the plurality of recognition signals.

11. The operating method of claim 10, further comprising: receiving information to be recognized.

12. The operating method of claim 10, further comprising: generating the comparison result after the voltage of the first connection node is converged to a constant value.

13. The operating method of claim 12, wherein source of the second transistors coupled to a ground power supply voltage.

14. The operating method of claim 12, wherein the outputting of the logic high level signal or a logic low level signal comprises comparing a voltage of the first connection node with a reference voltage by a differential amplifier driven by an enable signal and outputting a difference therebetween as a digital signal.

15. The operating method of claim 14, wherein the reference voltage is a voltage at which logic high level is output when the maximum value of the recognition signal is more than a predetermined value.

* * * * *